8 Sheets—Sheet 6.
E. B. BEECHER.
PAPER-BOX MACHINE.
No. 186,978 — Patented Feb. 6, 1877.
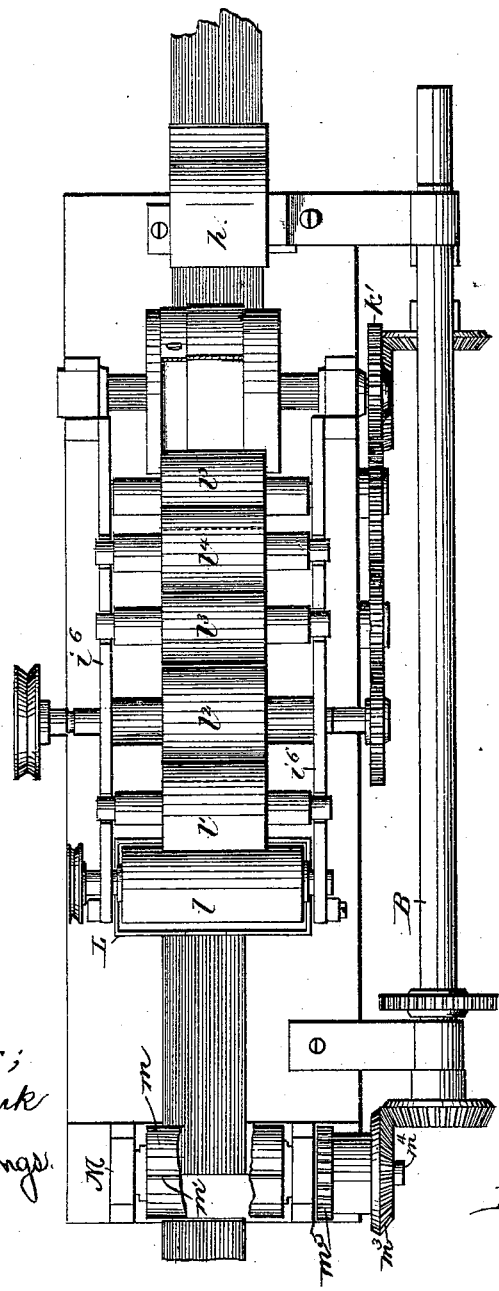
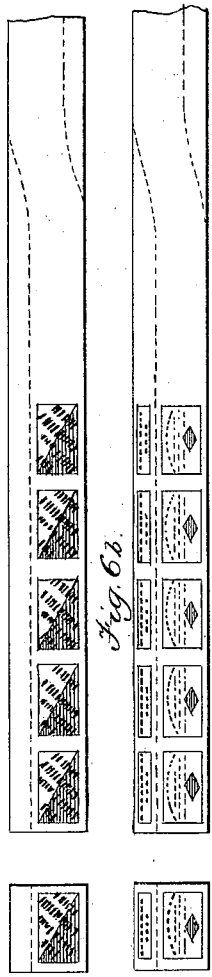
Witnesses:
Harry C. Clark
Wm. C. Stallings
Inventor,
E. B. Beecher
By H. W. Beadle & Co.
Atty's.

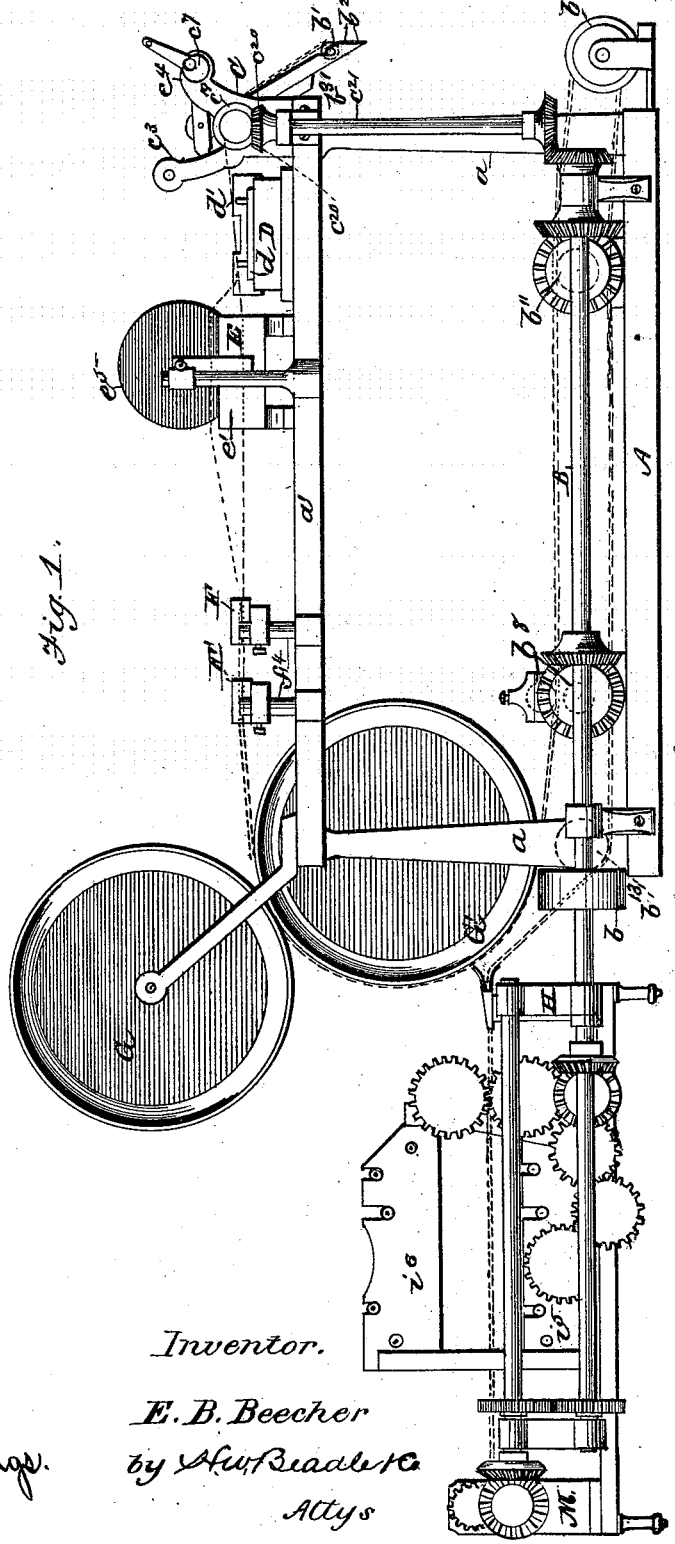

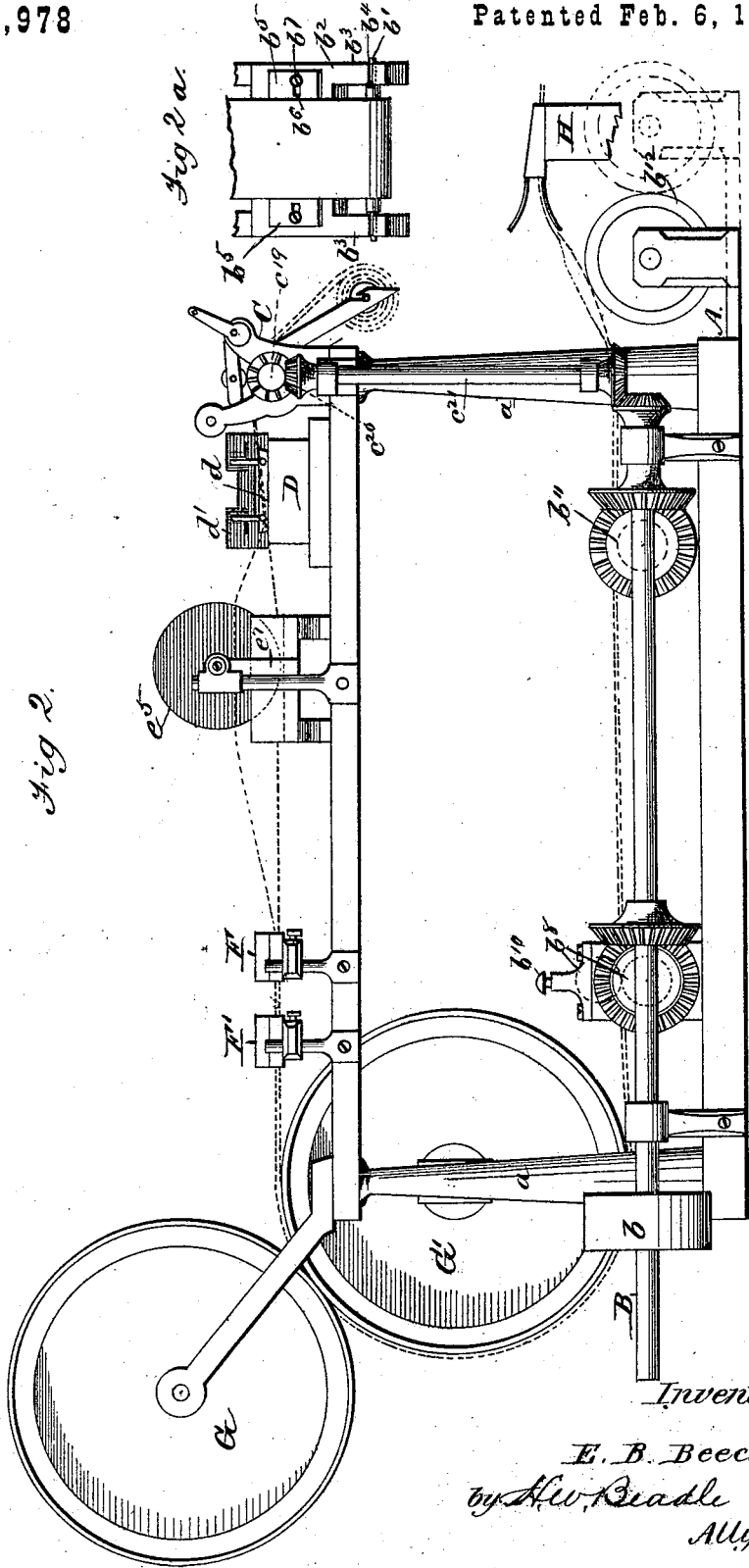

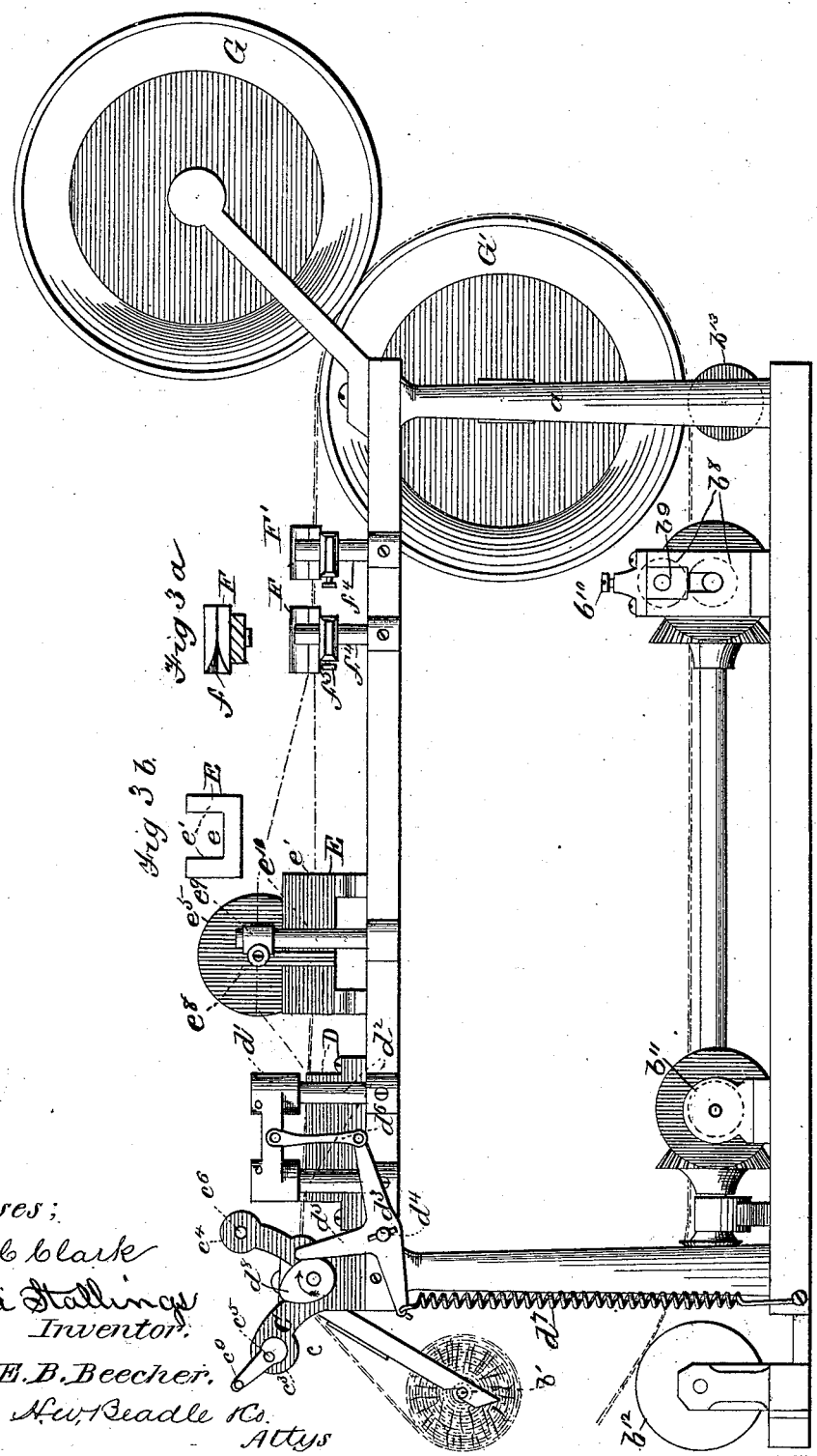

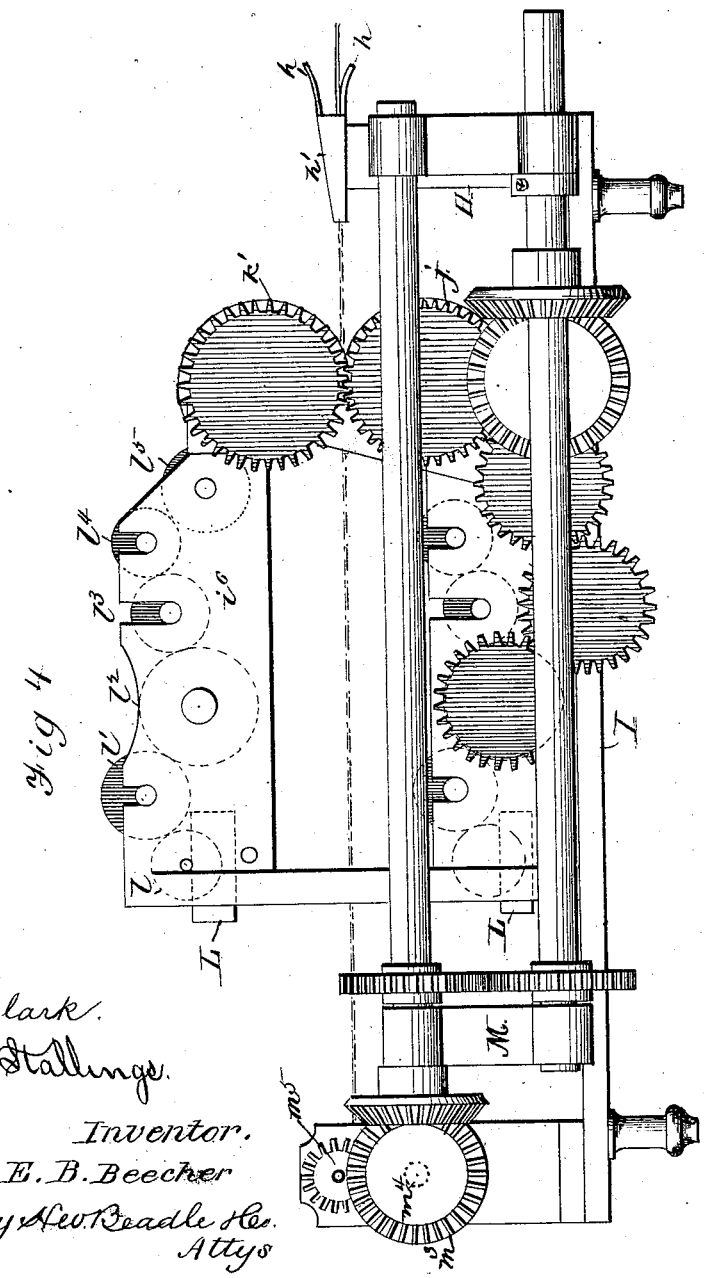

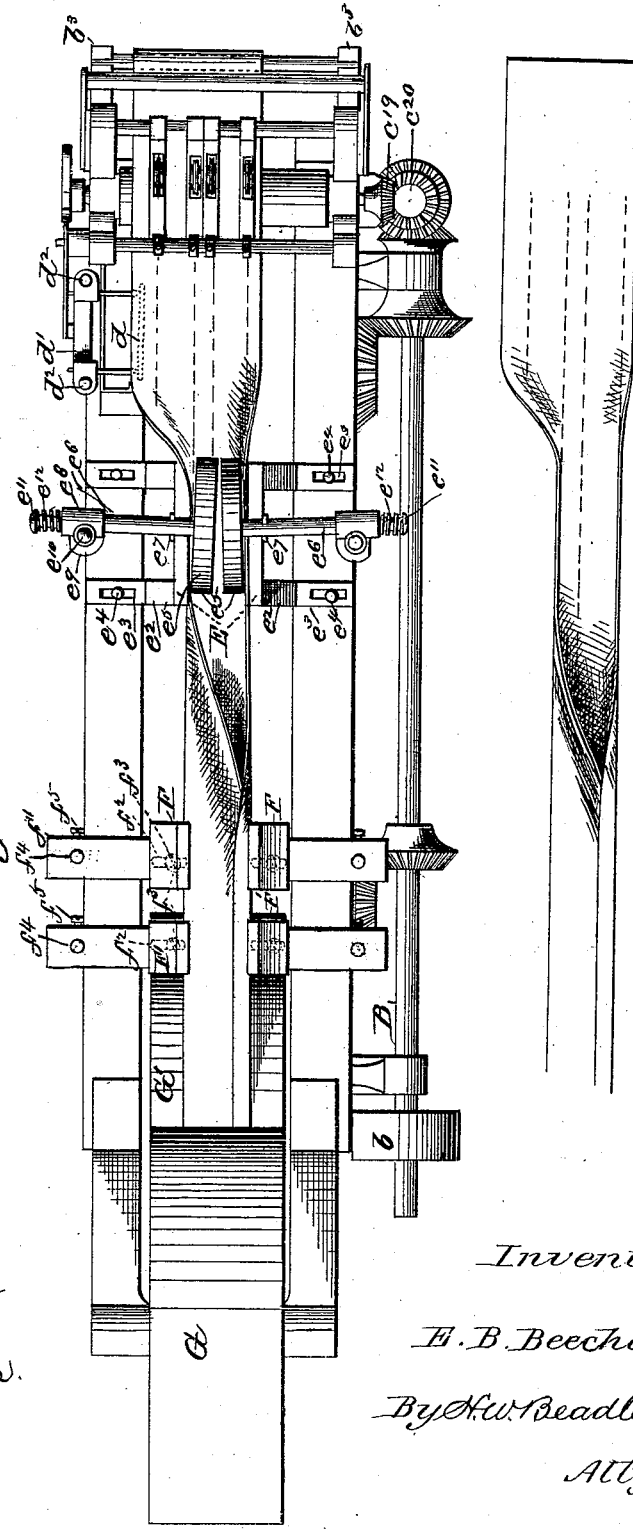

8 Sheets—Sheet 7.
E. B. BEECHER.
PAPER-BOX MACHINE.
No. 186,978. Patented Feb. 6, 1877.
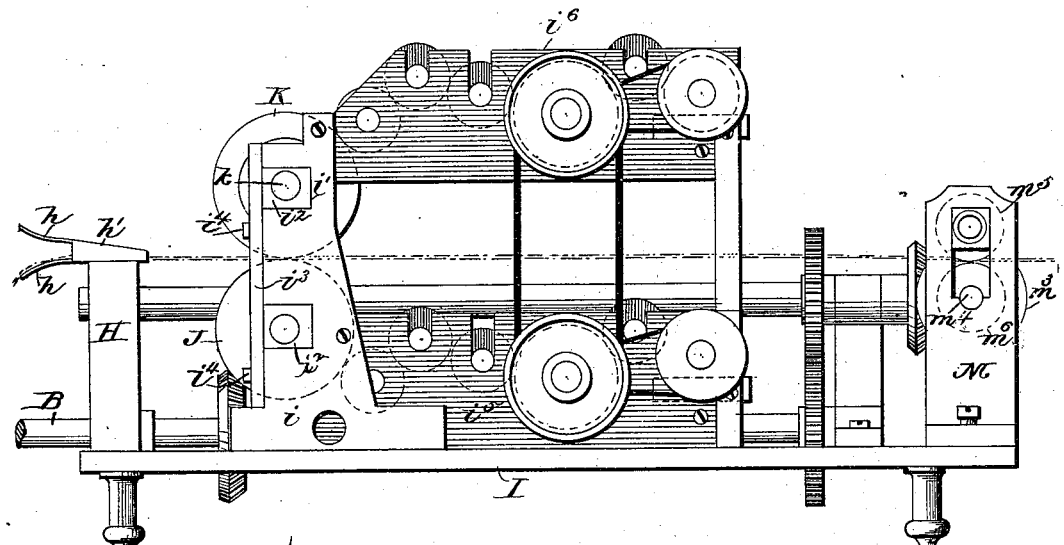
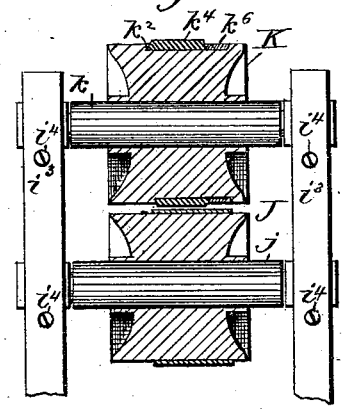
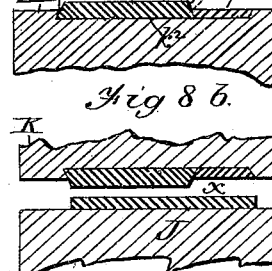
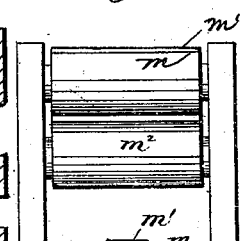
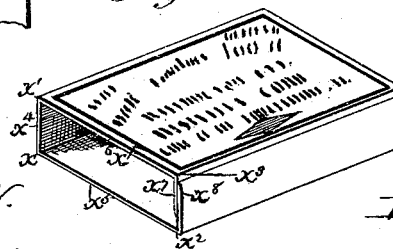
Witnesses:
Harry C. Clark.
Namie D. Hallings.
Inventor
E. B. Beecher
By H. W. Beadle & Co.
Attys.

8 Sheets—Sheet 8.
E. B. BEECHER.
PAPER-BOX MACHINE.
No. 186,978. Patented Feb. 6, 1877.
Fig. 10.
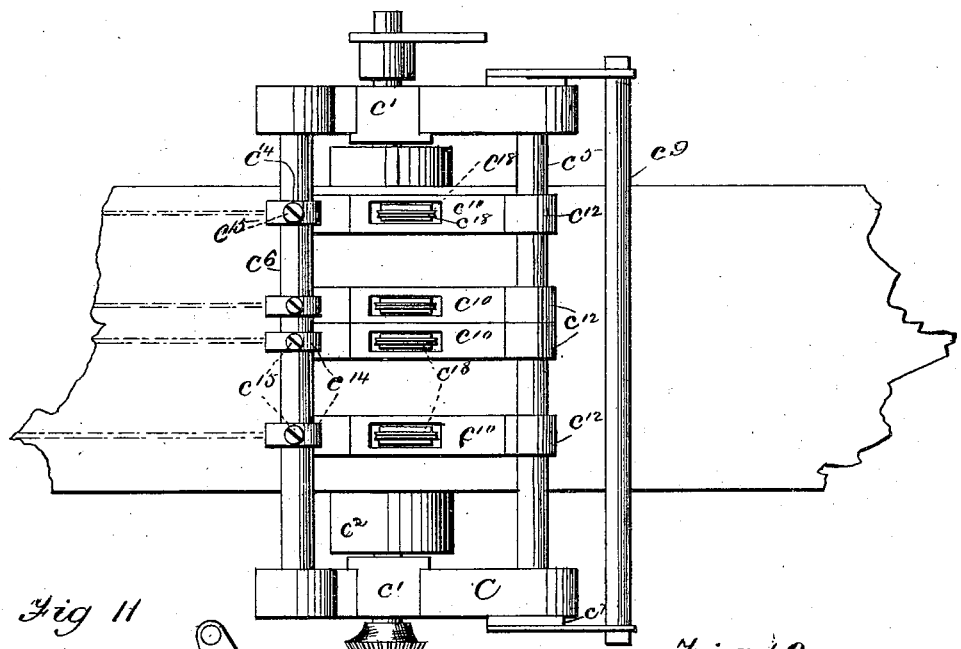
Fig. 11.
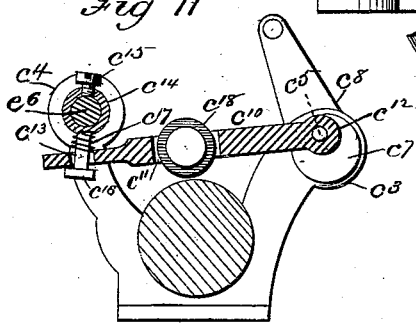
Fig. 12.
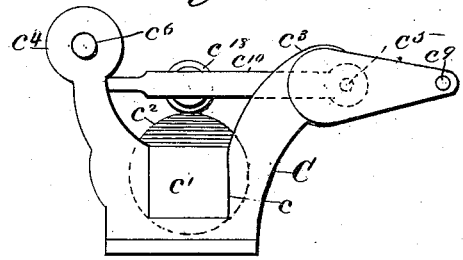
Fig. 13.
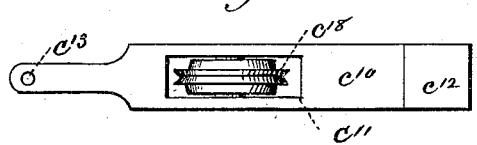
Fig. 14.
Witnesses,
Harry C. Clark
Mamie W. Stallings
Inventor.
E. B. Beecher.
By H. W. Beadle & Co,
Attys.

UNITED STATES PATENT OFFICE.

EBENEZER B. BEECHER, OF WESTVILLE, CONNECTICUT, ASSIGNOR TO SWIFT & COURTNEY & BEECHER COMPANY, OF SAME PLACE.

IMPROVEMENT IN PAPER-BOX MACHINES.

Specification forming part of Letters Patent No. 186,978, dated February 6, 1877; application filed August 11, 1876.

*To all whom it may concern:*

Be it known that I, EBENEZER B. BEECHER, of Westville, in the county of New Haven and State of Connecticut, have invented a new and improved method of, and machine for, making the drawer-cases of the parlor-match and other boxes; and I do hereby declare that the following is a full and exact description of the same, reference being had to the accompanying drawings, and to the letters of reference marked thereon.

This invention is designed to make the cases which are employed to cover the drawers of parlor-match and other boxes; and it consists mainly, first, in a peculiar method of making these cases, consisting, essentially, in scoring a continuous strip of pasteboard upon the proper bending-lines, forming the strip into a tube, and severing it into proper lengths; and, second, in the peculiar mechanism employed to carry the method practically into effect.

In the drawings, Figure 1 represents a side elevation of the special mechanism employed to carry my method practically into effect; Figs. 2 and 3, elevations taken from opposite sides of that portion of the same which is employed to form the pasteboard strip into a tube; Figs. 4 and 7, elevations taken from opposite sides of that portion which is employed to refold the tube, print the same, and sever it into separate cases. Fig. 5 is a plan view of the mechanism shown in Figs. 2 and 3. Fig. 6 is a plan view of the mechanism shown in Figs. 4 and 7. Fig. 8 is a transverse sectional elevation of the printing-rollers; Figs. 9 and 9ª, a front and sectional elevation of the cutting-rollers; and Figs. 10, 11, 12, 13, and 14, various views of the scoring mechanism.

To enable others skilled in the art to understand my method, and to carry it practically into effect, I will proceed to describe the same fully, and the mechanism employed therewith.

A general statement of the method may be made as follows: A continuous strip of pasteboard of proper width is longitudinally scored, by any suitable mechanism, upon the proper bending-lines, and then formed into a tube by uniting its edges. The scored tube, after being properly printed upon each side, if desired, is then severed into proper lengths, each length, when opened out from its flattened condition, constituting a quadrangular box or case adapted to inclose the drawer of the parlor-match or other box.

A general description of the operation of my machine may be made as follows: One end of the continuous strip of pasteboard is taken from a roll at one end of the machine, and, being properly carried through the same, is successively operated upon as follows: It first passes from the roll between adjustable blocks or plates, which properly guide it in its movement to the scoring-cutters, which latter, as it passes beneath them, score it upon the four parallel bending-lines at proper distances apart. Glue is then applied to one edge of the lower side of the strip as it passes along, after which it is bent or folded, by means of a guide box and wheels, upon two of its non-adjacent bending-lines into trough-like form. The partially-folded strip next passes between folding-guides, by means of which its edges are united to complete the tube, and then between pressing-rollers, which bring the glued parts closely in contact, in order that a perfect union may be effected. The tube thus formed, after being carried some distance to permit the glue to become cold, is then opened to separate the sides, which may adhere from the spreading of the glue, and refolded upon the opposite score lines. It then passes through the printing-press, where it receives an impression simultaneously upon each side, and is finally delivered to the cutters, which discharge it severed into proper lengths. Each separate length of the flattened tube, when opened out, constitutes a box or case, which is formed of a single transverse section of the continuous strip, bent at its angles upon the scored lines, as described.

A detailed description of the construction of the machine will now be given, the several parts for convenience being referred to under separate heads, as follows: first, the framework and the mechanism adapted to move and guide the pasteboard strip and tube;

second, the mechanism for scoring the strip; third, the mechanism for gluing the strip; fourth, the mechanism for folding the strip into a tube; fifth, the refolding mechanism; sixth, the printing-press; and, seventh, the cutters for severing the continuous tube into separate cases.

First, the frame-work and the mechanism adapted to move and guide the pasteboard strip and tube: A, Fig. 1, represents any proper base, from which rise the pillars $a\ a\ a\ a$, of any suitable construction, supporting the side beams $a'\ a'$, as shown. B represents the main shaft, located upon one side of the machine, and supported in any proper bearings rising from the base, which is provided, preferably near its center, with a main pulley, $b$, for receiving power from any suitable source, and at other proper points with gear-wheels, for conveying power directly or indirectly to the various parts of the machine. $b^1$ represents the roller or shaft adapted to receive the roll of pasteboard of which the tube is made. $b^2$ represents an inclined guiding-board, properly supported at one end of the machine, which is provided with arms $b^3$, Fig. 2$^a$, having open bearings $b^4$, for the removable shaft $b^1$, as shown. $b^5\ b^5$ represent plates or blocks, adjustably secured to the board $b^2$ by means of slotted openings $b^6$ and securing-screws $b^7$, as shown, which are adapted to properly guide the pasteboard in its movement to the scoring-cutters. The scoring, gluing, and folding mechanism, which next act on the strip in its movement, will be, as before stated, referred to under separate heads, the description now relating simply to the mechanism for moving and guiding the pasteboard. $b^8\ b^8$, Figs. 2 and 3, represent the drawing-rollers, the lower one of which is provided upon one end of its shaft with a bevel-gear wheel, engaging with a similar wheel upon the main shaft, as shown. These rollers are held in proper bearings in suitable standards rising from the base, the upper one being adapted, by means of loose boxes or journals $b^9$, Fig. 3, to be adjusted vertically by the set-screws $b^{10}$, for the purpose of regulating the amount of pressure upon the pasteboard. $b^{11}\ b^{12}\ b^{13}$, Figs. 1, 2, and 3, represent rollers of any suitable construction, located at any proper points, for the purpose of guiding the tube in its movement, or changing its direction, the particular position of these not being a matter of essential importance. The roller $b^{12}$, however, is made adjustable, as shown in Fig. 2, in order that it may be moved to vary the distance traveled by the tube, so that in hot weather the distance may be increased in order that the glue may be given time to dry.

By means of the construction described, the various parts are properly supported, and the pasteboard strip is given its proper movement through the machine.

Second, the mechanism for scoring the strip: C, Figs. 2, 10, and 12, represents a casting or frame, supported transversely by the main frame, as shown, which is provided at each end with a socket, $c$, for the bearing-box $c^1$ of the roller $c^2$, and with divergent arms $c^3\ c^4$, having bearings for the transverse shafts $c^5\ c^6$, as shown. $c^7\ c^7$, Figs. 1 and 11, represent sleeves or collars, resting in the bearings of the arms $c^3$, which form the journals of the shaft $c^5$, eccentrically attached thereto, as shown. $c^8\ c^8$ represent crank-arms attached to the sleeves $c^7$, which are united for harmonious movement by the transverse rod $c^9$, Fig. 10, as shown. $c^{10}\ c^{10}$, Figs. 10, 11, and 13, represent the frames or boxes carrying the scoring-cutters, each being identical in construction, and consisting of a suitable metal bar or block, having a central slot, $c^{11}$, a horizontal eye, $c^{12}$, at one end inclosing the shaft $c^5$, and a vertical opening, $c^{13}$, at the other, as shown. $c^{14}$ represents a sleeve or collar loose upon shaft $c^6$, which is provided with a set-screw, $c^{15}$, by means of which it may be secured at any desired point. $c^{16}$ represents a screw, the threaded end of which is held by a proper socket in the sleeve $c^{14}$, while its shank extends through the opening $c^{13}$, and its head supports the moving end of the frame $c^{10}$, as shown. $c^{17}$ represents an intermediate spring, inclosing the shank of screw $c^{16}$, which is adapted to force down the end of the frame $c^{10}$ when the screw $c^{16}$ is loosened. $c^{18}$ represents the scoring-cutter, consisting of a suitable disk or wheel journaled in the central slot of the box, which is provided with a peripheral knife or cutter adapted to score or indent two or more parallel contiguous lines. $c^{19}$, Fig. 10, represents a gear-wheel upon the end of the shaft of the roller $c^2$, which is adapted to engage with a similar gear-wheel, $c^{20}$, Fig. 2, upon the vertical shaft $c^{21}$, receiving movement by means of an intermediate gear-wheel from the main shaft, as shown.

The scoring-cutters, it will be observed, are directly over the roller $c^2$.

The operation of this mechanism is substantially as follows: The entire series of cutters may be raised to permit the introduction of the strip by revolving the shaft $c^5$ in the proper direction by means of the rod $c^9$, this effect being produced because this shaft is eccentrically attached to its journals, as before described. By means of this construction, also, the cutters may be adjusted accurately to score the pasteboard just the proper depth. Each individual cutter is adjusted to make it harmonize with the series by regulating the screw $c^{16}$, which supports the free end of the cutter box or frame, as shown. Each individual cutter also may be adjusted laterally upon the shafts $c^5\ c^6$, for the purpose of obtaining the proper position relatively to each other and the edges of the strip. The pasteboard being scored upon each bending-line by two contiguous cutters, a double indentation is formed, by means of which sufficient space is afforded to permit the interior pasteboard to assume its new position when bent, without bulging out its exterior surface and breaking the covering-paper, the latter, in consequence, being simply folded at the angle without undue strain.

Third, the mechanism for gluing the strip: D, Figs. 2 and 3, represents a metal box, suitably supported upon the frame-work at the proper point, which is adapted to hold the hot glue. $d$ represents a bar or strip of suitable length and width, which is attached, by means of the bent connecting-arms, to the cross-head $d^1$, adapted to slide vertically upon the upright standards $d^2$ $d^2$, as shown. $d^3$ represents a beam, pivoted to the horizontal stud or shaft $d^4$, extending from the frame, which is provided with the vertical arm $d^5$, and has attached at one end, by an intermediate connecting-rod, $d^6$, the cross-head $d^1$, and at the other the upper end of an intermediate spring, $d^7$, secured below to the base or frame, as shown. $d^8$ represents a cam of proper size and shape, attached to one end of the shaft of roller $c^2$, which is adapted, when the roller is in motion, to move the vertical arm in one direction, as shown in Fig. 3. In consequence of this movement, and the reaction of the spring $d^7$, which operates the arm in the opposite direction, the latter is properly moved to rock the beam $d^3$, and thus, by means of the intermediate connecting-rod, give the cross-head a reciprocating movement in a vertical direction. By means of this action, the glue-bar is lifted from the box at regular intervals, and is brought into contact with the lower side of one edge of the moving strip of pasteboard.

Fourth, the mechanism for folding the strip into a tube: Three different devices are employed for folding the scored and glued strip into a tube, and these will be described in their proper order. E, Figs. 3 and 5, represent a guiding or folding box, having a bottom, $e$, and sides $e^1$ $e^1$, but without ends or top. This is centrally supported by transverse bars or brackets $e^2$, having slotted feet $e^3$, held by set-screws $e^4$, by means of which lateral adjustment, if desired, is readily made. $e^5$ $e^5$ represent wheels, adapted to revolve in the box upon the strip, and form the same, in connection with the sides, into a trough, as shown. $e^6$ $e^6$ represent the axles or shafts of the wheel, located only on the outer sides, which are held near one end by bearings in the standards $e^7$, attached to the sides of the box, and near the other by the horizontal socket $e^8$, projecting from the vertical socket $e^9$ upon the standard $e^{10}$, as shown. $e^{11}$ represents a washer screwed to the end of the axle, and $e^{12}$ a spring located between the washer and the outer end of the socket $e^8$, by means of which the wheel is drawn closely against the inner side of box E, and yet is free to yield to permit the passage of any serious obstruction. The shafts $e^6$ of the wheels, also, it will be observed, are held at an angle, as shown in Fig. 5, for the purpose of accurately bending the strip upon the score-lines before it leaves the box.

F F, Figs. 2, 3, and 5, represent duplicate folding-guides, each provided with the central tapering folding-slit $f$, Fig. 3ª, which are secured to the transverse supporting-bar $f^1$, having the slots $f^2$, Fig. 5, by means of the set-screws $f^3$, as shown, by means of which construction they may be adjusted readily in a lateral direction, if desired. The transverse supporting-bar is itself provided at its ends with openings, which inclose vertical standards $f^4$, upon which it may be adjusted at any proper height, and be readily held, when adjusted, by the set-screws $f^5$. F' F' represent similar folding-guides, supported in the same manner, and capable of adjustment in the same way, which are held, however, on a lower plane than the guides F F, for the purpose of bending the tube in its movement over the ends of the latter, in order to more completely fold the same.

By means of these devices the scored and glued strip is formed into a tube; but to more perfectly unite the edges and secure a perfect union between them, the following mechanism is employed: G G' represent rollers of large size and heavy weight, between which the folded tube next passes, by means of which sufficient pressure is employed to bring its glued portions closely in contact, and cause them to adhere. The tube, it will be observed, passes around the large wheel G' with its lap or fold upon the outside, and hence the tendency is to draw this lap firmly to place and hold it there until a union is effected. Unless this drawing action took place the lap or fold would spring away from its proper place, and a perfect union could not be made. After leaving the roller G' it is further acted upon by the drawing-rollers $b^8$.

The operation of the folding devices will be readily understood. The strip is partially folded by the wheels and box, then united by the guides F F', and finally perfectly united by the pressing and drawing rollers.

It will be understood that the strip, although scored in four bending-lines to form an angular box, is only folded at first upon two diagonally opposite score-lines to form a flattened tube, it being refolded afterward on the other score-lines, as will now be fully described under its proper head.

Fifth, the refolding mechanism: After the tube leaves the pressing-rollers it is carried, by any suitable arrangement of guide-rollers, for a sufficient distance to permit the glue to become cold. The sides are then separated by any suitable means to break them apart where they may chance to be united by the spreading of the glue beyond the edge of the inner lap. The tube then passes to the refolding device, now to be described, by means of which it is again bent or folded upon the diagonal score-lines not before used.

H H, Figs. 4 and 7, represent suitable standards rising from the base, which are provided above with the folder, having the converging curved plates $h$ $h$, united by the triangular side pieces $h'\ h'$, as shown. By means of this device the tube which has been separated is brought together in its new position to form again a flattened tube, suitable to be acted upon by the printing-press.

Sixth, the printing-press: A general description of the operation of the press may be made as follows: The flattened tube is caused to pass between two constantly-revolving type-rollers, and receives therefrom simultaneously upon each side an independent series of impressions. Each roller being independent of the other, and having its own proper inking mechanism, different colors may be employed, if desired.

The construction of the press is as follows: I, Fig. 7, represents any suitable base for supporting the remaining parts. $i\ i$ represent standards rising from the base, provided at proper points with square recesses $i^1$, for receiving the boxes $i^2$ of the type-roller shafts, as shown. $i^3$ represents a securing-bar, and $i^4$ securing-screws, by means of which the boxes are held properly in place. $i^5\ i^6$ represent the side plates, by means of which the inking mechanism of the upper and lower type-rollers are held. J, Figs. 7, 8, and 8ª, represents the lower type-roller, provided with a proper shaft, $j$, adapted to revolve in the boxes $i^2$, before described, and having at one end a gear-wheel, $j'$, Fig. 4, adapted to receive movement through proper intermediate mechanism from the main shaft. This roller is recessed in any proper manner to receive the type-block, and may be further recessed, also, if desired, to furnish space for the passage of the lap or fold of the tube. K represents the upper type-roller, having a shaft, $k$, and gear-wheel $k^1$, Fig. 4, as shown, this latter meshing with wheel $j$, and receiving movement therefrom, in order that the two may revolve in harmony with each other. $k^2$, Fig. 8ª, represents a recess, adapted to receive the type-block, which is provided upon one side with an overhanging edge or flange, $k^3$, as shown. $k^4$ represents the type-block, having inclined edges $k^5$, as shown; and $k^6$, a securing-block, having on one side the corresponding edge $k^7$, as shown.

When in place the type-block is held by the projection of its inclined edges beneath the overhanging portions of the roller and the securing-block $k$, as shown. In the construction shown, the upper roller is provided with the recess for the lap, as shown at $x$, Fig. 8ᵇ.

The inking mechanism of the two rollers are similar in construction, and the description of one will answer for both.

L, Figs. 4 and 6, represents the ink-box, in which revolves the primary roller $l$, as shown. $l^1\ l^2\ l^3\ l^4\ l^5$ represent the remaining rollers of the series, by means of which ink is conveyed to the printing-roller, and also properly distributed. Movement is communicated to these various rollers by gearing from the main shaft and by belts and pulleys, as clearly shown in the drawing.

It will be understood, as before described, that as the flattened tube passes between the type-rollers, a continuous series of impressions is given simultaneously to each side, as shown in Figs. 6ª and 6ᵇ, each roller being supplied by its independent inking mechanism with a different-colored ink.

By means of this method of printing, the sides and top or bottom of a box receive an impression at the same time.

Seventh, the cutters for severing the continuous tube into separate cases: M M, Figs. 4, 6, and 7, represent suitable standards rising from any proper base, which are provided with bearings for the roller $m$, Figs. 9 and 9ª, having the knives or cutters $m^1$ and the roller $m^2$, against which the knives act. $m^3$, Fig. 7, represents a gear-wheel upon shaft $m^4$, by means of which movement is received directly or indirectly from the main shaft; and $m^5\ m^6$, gear-wheels by means of which the rollers are caused to revolve in harmony with each other.

The cutter, it will be observed, bears such relation to the printing-rollers that the lengths cut by them correspond precisely with the series of impressions received from the type-blocks, so that the tube is finally severed into separate cases, properly printed, and ready for use, as shown in Fig. 9ᵇ.

The operation of the machine as a whole is substantially as follows: The roll containing the strip of pasteboard having been placed in position, and one end of the strip passed into the machine, the operation is substantially as follows: The strip is first accurately guided, by means of the guiding-plates, as shown in Fig. 2ª, to the scoring-cutters, so that the bending-lines may be located at the proper points. In passing beneath the scorers the strip receives four parallel double lines or indentations, as shown in Figs. 5 and 10, two of which are located near together in the central portion of the strip, and the remaining ones are on each side near the edge, as shown. The central lines, when the case is completed, form the upper and lower angles $x\ x^1$, Fig. 9ᵇ, at one side of the box, and the other lines the upper and lower angles $x^2\ x^3$ at the other side, the intermediate narrow portion $x^4$ between the central lines forming one side of the box, the extended surfaces $x^5\ x^6$ upon each side of the central lines the top and bottom, and the extended edges $x^7\ x^8$ beyond the outer bending-lines the other side, the two edges being united by a lap, as shown.

These score-lines or indentations are made the proper depth to permit bending readily without danger of breaking through.

By making the indentations double, also, sufficient space is left to permit the parts to assume their new positions without straining or breaking the covering-paper.

After passing the scoring-cutters the strip receives glue upon one edge from the gluing mechanism, as shown in dotted lines, Fig. 5, and is then partially folded by the wheels and guide-box. In its continued movement it is then completely folded to unite the edges and form the tube by the duplicate folders F F', and then pressed by the rollers to insure perfect contact and union between the edges. It then passes indirectly to the press, where it receives a series of impressions upon each side, as shown in Figs. $6^a$ and $6^b$, and then to the cutters, where it is severed into proper lengths and discharged, complete cases, properly printed, ready for use, as shown in Fig. $9^b$.

The construction of the machine is such, it will be observed, as to be continuous in its movement, and as most of its moving parts are adapted to revolve, it may be run at a high rate of speed, and accomplish a large amount of work, without danger of injuring the mechanism.

The machine, of course, while designed for the special purpose named, may be adapted for making cases of any size, for any purpose.

The precise location of the different mechanisms employed for the several purposes described is not essential.

If desired, the two main divisions of the machine shown may be operated by power from different sources, and the tube may run from the front end of the first machine to the refolder, as shown in Fig. 2, instead of being carried back through the machine again, as shown in Fig. 1. In either case, however, sufficient space should be left between the tube-forming machine and the refolding mechanism to permit the glue to dry properly.

Some of the advantages of the described construction are as follows: The machine is adapted to make complete cases, ready for use, from a continuous strip of pasteboard, without waste, and with great rapidity, in consequence of which the cost of manufacture is greatly reduced, and a product uniform in size, appearance, and quality is produced.

The machine being mainly automatic in its action, it may be operated by unskilled labor.

Having thus fully described my invention, what I claim as new, and desire to secure by Letters Patent, is—

1. The method herein described of making drawer-cases, consisting, essentially, in scoring a continuous strip of pasteboard upon the proper bending-lines for forming the angles of the case, forming the scored strip into a tube, severing the tube into proper lengths, and opening out the separate lengths upon the angle-lines, to form a complete case, substantially as set forth.

2. The method herein described of making drawer-cases, consisting, essentially, in scoring a continuous strip of pasteboard upon the proper bending-lines, forming the strip into a tube, printing the tube upon its flattened sides, and severing the tube into lengths coinciding with the separate impressions of the press, substantially as described.

3. The combination of the following elements: mechanism, substantially as described, for drawing and guiding the pasteboard strip; mechanism, substantially as described, for scoring the same; mechanism, substantially as described, for gluing one edge; mechanism, substantially as described, for folding the glued strip upon one set of bending-lines into a tube; mechanism, substantially as described, for refolding the tube upon the other set of bending-lines, and mechanism, substantially as described, for severing the tube into proper lengths.

4. In combination with mechanism for scoring and gluing the strip, and folding the same into a tube, mechanism, substantially as described, for printing the sides of the tube.

5. In combination with mechanism for scoring and gluing the strip and folding the same into a tube, mechanism, substantially as described, for printing the same and severing it into proper lengths, substantially as described.

6. In combination with mechanism, substantially as described, for printing simultaneously its sides, and for drawing the flattened tube, mechanism, substantially as described, for severing it into lengths corresponding with the impression of the press.

7. The method described of scoring a pasteboard strip with a double line of indentations, as and for the purpose described.

8. The method described of printing simultaneously the top and one side, and the bottom and remaining side, of a drawer-case, consisting, essentially, in folding a tube into a flattened condition upon the proper bending-lines, and passing it between the impression-rollers.

9. The combination of the boxes $c^{10}$, carrying the score-cutters $c^{18}$, and the eccentric shaft $c^5$, for adjusting them with the shaft $c^6$ and set-screws $c^{16}$, as described.

10. The score-cutter $c^{18}$, substantially as described, adapted to form a double line of indentations, as and for the purpose set forth.

11. The combination of the shaft $c^5$ $c^6$ and the boxes $c^{10}$, having eyes $c^{12}$, with sleeves $c^{14}$, and the intermediate connecting devices, substantially as described, the construction being such that the boxes are laterally adjustable upon the shaft, as described.

12. The combination of the glue-box and its connections with the reciprocating cross-head and its actuating mechanism, substantially as described.

13. In combination with the guide-box E, the wheels $e^5$, set at an angle, as and for the purpose set forth.

14. In combination with the guide-box and wheels $e^5$, the spring $e^{12}$, as described, for the purpose described.

15. In combination with tube-forming mechanism and refolding mechanism, an adjustable roller $b^{12}$, adapted to vary the distance traveled by the tube, substantially as described.

16. The method described of uniting the glued edges of a tube, consisting, essentially, in passing the same about a wheel of large diameter, with the lap or fold upon the outside, by means of which the lap is drawn to place, and securely held until a union has been effected.

This specification signed and witnessed this 25th day of July, 1876.

E. B. BEECHER.

Witnesses:
WM. H. SWIFT,
H. W. BEADLE.